United States Patent
Mitchell et al.

(10) Patent No.: US 11,052,370 B2
(45) Date of Patent: Jul. 6, 2021

(54) METHOD AND DEVICE FOR PRODUCING PRINTED MICROARRAYS

(71) Applicant: Arrayjet Limited, Lothian (GB)

(72) Inventors: Benjamin Mitchell, Northumberland (GB); Joan Salvatella Serra, Edinburgh (GB)

(73) Assignee: ARRAYJET LIMITED, Lothian (GB)

(*) Notice: Subject to any disclaimer, the term of this patent is extended or adjusted under 35 U.S.C. 154(b) by 0 days.

(21) Appl. No.: 16/640,028

(22) PCT Filed: Sep. 5, 2018

(86) PCT No.: PCT/GB2018/052507
§ 371 (c)(1),
(2) Date: Feb. 18, 2020

(87) PCT Pub. No.: WO2019/048846
PCT Pub. Date: Mar. 14, 2019

(65) Prior Publication Data
US 2020/0238248 A1    Jul. 30, 2020

(30) Foreign Application Priority Data
Sep. 5, 2017 (GB) .................................. 1714265

(51) Int. Cl.
*B01J 19/00* (2006.01)
*B01L 3/00* (2006.01)
(Continued)

(52) U.S. Cl.
CPC ....... *B01J 19/0093* (2013.01); *B01J 19/0046* (2013.01); *B01L 3/5085* (2013.01);
(Continued)

(58) Field of Classification Search
CPC ............... B01J 19/0093; B01J 19/0046; B01J 2219/00804; B01J 2219/00378;
(Continued)

(56) References Cited

U.S. PATENT DOCUMENTS

| 6,558,623 B1 | 5/2003 | Ganz et al. |
| 2004/0023223 A1 | 2/2004 | Thompson et al. |

(Continued)

FOREIGN PATENT DOCUMENTS

| EP | 1 096 250 A2 | 5/2001 |
| GB | 2 395 484 A | 5/2004 |

(Continued)

OTHER PUBLICATIONS

UK Search Report on GB1714265.4 dated Jun. 4, 2018 (4 pages).
(Continued)

*Primary Examiner* — Bradley W Thies
(74) *Attorney, Agent, or Firm* — Foley & Lardner LLP

(57) ABSTRACT

Method for manufacturing microarrays and verifying the quality of said microarrays, wherein the method comprises: a) providing at least one reagent, b) loading said at least one reagent in a dispensing print head, in a predetermined arrangement, c) in a first print pass, generating instructions for the print head and moving said print head with respect to a substrate to print said at least one reagent on the substrate to obtain microarrays, d) obtaining an image of the printed microarrays by means of a camera, e) processing the obtained images of the printed microarrays, to calculate parameters indicative for the quality of the printed microarrays, f) comparing, at the end of the first print pass, the calculated parameters for the printed microarrays with predetermined criteria for the microarrays, to identify possible printing defects, g) comparing, for the printed microarrays, the identified printing defects of step f), h) using the out- (Continued)

come of the comparison of step g) to select a corrective action to improve the quality of the microarrays, prior to the printing of a subsequent print pass.

11 Claims, 2 Drawing Sheets

(51) Int. Cl.
*B41M 5/00* (2006.01)
*G01N 21/956* (2006.01)
*G01N 21/84* (2006.01)

(52) U.S. Cl.
CPC ......... *B41M 5/0041* (2013.01); *G01N 21/956* (2013.01); *B01J 2219/00804* (2013.01); *B01L 2200/12* (2013.01); *B01L 2300/0636* (2013.01); *B01L 2300/0893* (2013.01); *G01N 2021/8411* (2013.01)

(58) Field of Classification Search
CPC .... B01J 2219/00527; B01J 2219/00596; B01J 2219/00605; B01J 2219/00659; B01J 2219/00693; B01J 2219/00695; B01J 2219/00722; B01J 2219/00725; B01J 2219/0074; B01L 3/5085; B01L 2200/12; B01L 2300/0636; B01L 2300/0893; B41M 5/0041; G01N 21/956; G01N 2021/8411; B41J 29/393

See application file for complete search history.

(56) References Cited

U.S. PATENT DOCUMENTS

| | | | |
|---|---|---|---|
| 2004/0062686 A1* | 4/2004 | Ganz | G01N 35/1074 506/32 |
| 2004/0197817 A1* | 10/2004 | Caren | B01J 19/0046 435/6.11 |
| 2005/0044378 A1 | 2/2005 | Beard et al. | |

FOREIGN PATENT DOCUMENTS

| | | |
|---|---|---|
| WO | WO-02/04123 A1 | 1/2002 |
| WO | WO-2004/073988 A2 | 9/2004 |

OTHER PUBLICATIONS

International Search Report and Written Opinion of the International Searching Authority on PCT/GB2018/052507 dated Oct. 25, 2018 (9 pages).

* cited by examiner

METHOD AND DEVICE FOR PRODUCING PRINTED MICROARRAYS

CROSS-REFERENCE TO RELATED APPLICATIONS

The present application is a U.S. National Stage Application under 35 U.S.C. § 371 of International Patent Application No. PCT/GB2018/052507, filed on Sep. 5, 2018, which claims the benefit of priority to United Kingdom Patent Application No. 1714265.4, filed on Sep. 5, 2017, the disclosure of each of which is incorporated by reference herein in its entirety.

FIELD OF THE INVENTION

The invention relates generally to a method and a device for manufacturing microarrays. A microarray comprises plurality of spots, each spot comprising a material comprising biomolecules. The microarray is produced by printing an adapted reagent, comprising said biomolecules on a substrate using a dispensing print head, In particular, there is described a method and a device of printing microarrays, inspecting the quality of the printed microarrays to determine whether the microarrays are correctly printed by reviewing the presence, location and size of individual spots printed on the substrate and for providing means for taking corrective action to improve the quality of the printed microarrays.

BACKGROUND OF THE INVENTION

Microarrays (also known as biochips) are important in the study of biomolecules such as genomic DNA, cDNA, oligonucleotide sequences, proteins, antibodies and the like. Suitably biomolecules are provided to a substrate in an ordered array and then analytes can be provided to the substrate to determine binding to the biomolecules of the substrate. This can be useful in analysis of biomolecular interactions or reactions, for example to profile gene expression, discovery of therapeutic molecules, or to measure protein binding. Printing of the biomolecules onto a substrate allows such analysis to be undertaken on large number of samples.

Microarrays are printed by means of an array printer, or microarrayer, comprising a dispensing print head, such as an inkjet array printer. The dispensing print head is used to print a reagent loaded in the print head, comprising the biomolecules, on a solid substrate, such as a slide.

Normally, the print head will be loaded with a plurality of reagents, each comprising a specific biomolecule. The slides to be printed are loaded onto a tray and the print head is moved with respect of the tray in subsequent print passes to print all the slides in a complete print job. Once all the slides have been printed, the tray and the slides are removed from the array printer.

A significant problem in printing of biomolecules is the print variation of the spots containing the biomolecules onto the substrate. For example the size, shape or the location of the spots can be incorrectly provided on the array, or indeed the spot may not be printed at all.

The task of printing microarrays requires the transfer of extremely small amounts of many different reagents from separate wells in the print head to closely spaced positions on the substrate. Printing of microarrays can be done, for instance, by projecting the printing liquid through the air onto the substrate without contact using a print head provided with nozzles, such as an inkjet print head. It should be noted that other print heads could also be used, such as for instance, a bubble jet. Typically the main difficulty with such inkjet technology is that air in a nozzle can cause it to print misplaced or malformed spots or fail to print a spot. Several factors can cause printing errors. These factors include blockage or failure of a nozzle, sample precipitation, unsuitable sample viscosity or empty reagent wells.

U.S. Pat. No. 6,558,623 discloses a device and a method to quality check or inspect microarrays, once a slide is completed. The device and the method according to U.S. Pat. No. 6,558,623 are particularly adapted to print a multitude of microarrays on slides during a print job and to review the overall quality of the slides at the end of the print job to qualify the slides pass or fail.

Whilst known inspection and analysis techniques have discussed control systems which check for spot quality on a substrate on which printing of spots has been completed, either by manual intervention or automatically, this typically requires interaction at the end of a completed print job. This means that after a print run in which a plurality of slides have been printed, the quality of the slides can be analysed and corrective action can be taken to correct printed slides. The effect of this can be that additional reagent needs to be provided to the print head to allow correcting printed slides. This can be costly and/or time consuming.

The aim of the invention is to provide a method and a device which allow analysing, during a print job, after each individual print pass thereof, the quality of the printing. This allows for corrective measure being taken during the print job; not at the end thereof.

SUMMARY OF THE INVENTION

According to a first aspect of the present invention there is provided a Method for manufacturing microarrays and verifying the quality of said microarrays, wherein the method comprises:

a) providing at least one reagent, b) loading said at least one reagent in a dispensing print head, in a predetermined arrangement, c) in a first print pass, generating instructions for the print head and moving said print head with respect to a substrate to print said at least one reagent on the substrate to obtain microarrays, d) obtaining an image of the printed microarrays by means of a camera, e) processing the obtained images of the printed microarrays, to calculate parameters indicative for the quality of the printed microarrays, f) comparing, at the end of the first print pass, the calculated parameters for the printed microarrays with predetermined criteria for the microarrays, to identify possible printing defects, g) if printing defects are identified, comparing, for the printed microarrays, the identified printing defects of step f), h) using the outcome of the comparison of step g) to classify the identified printing defects as random or non-random printing defects, and i) using the classification of step h) to select a corrective action to improve the quality of the microarrays, prior to the printing of a subsequent print pass.

Suitably, the method comprises:

j) in case the printing defects in step h) are classified as non-random printing defects:

k) selecting a possible cause for the non-random printing defects, l) amending the generation of instructions for the print head and/or amending arrangement of the print head prior to the printing of a subsequent print pass.

Suitably the step of selecting a possible cause for the non-random printing defects comprises;
selecting the cause of the printing defect to be linked to a reagent problem.

Suitably the step of selecting a possible cause for the non-random printing defects comprises:
selecting the cause of the printing defect to be linked to the non-functioning of a nozzle.

Suitably the step of amending the generation of instructions for the print head and/or amending arrangement of the print head prior to the printing of a subsequent print pass comprises:
loading new reagent.

Suitably, the step of amending the generation of instructions for the print head and/or amending arrangement of the print head prior to the printing of a subsequent print pass comprises:
instructing the use of a nozzle, different from the non-functioning nozzle.

Suitably, the method comprises:
m) in case the printing defects in step h) are classified as random printing defects:
n) reviewing of the non-random printing defects, and
o) using the result of the review of step o) to decide to select between continuing printing or reprinting of microarrays or individual spots elements thereof.

Suitably the step of obtaining an image of the printed microarrays by means of a camera, comprises:
p) obtaining per microarray a first image of the substrate prior to printing of the microarray with a second camera, positioned ahead of the print head and obtaining a second image of the substrate after the printing of the microarray on the substrate.

Suitably the step of processing the obtained images of the printed microarrays comprises:
q) processing per microarray the image of the substrate obtained by means of the first camera and the image of the substrate obtained by means of the second camera to calculate parameters indicative for the quality of the printed microarray.

According to a second aspect of the present invention there is provided a device for manufacturing microarrays and verifying the quality of said microarrays, the device comprising:
a dispensing print head, adapted to contain at least one reagent,
means for generating instructions to said print head and for moving said print head during a first print pass with respect to a substrate to print said at least one reagent on the substrate to obtain microarrays,
at least a first camera capable of obtaining an image of the substrate on which a microarray is printed,
processing means, connected to the at least first camera, adapted to receive the image from the at least first camera, and adapted to calculate parameters indicative for the quality of the printed microarrays, wherein the processing means are further adapted to compare, at the end of the first print pass, the calculated parameters for the printed microarrays with predetermined criteria for the microarrays, to identify possible printing defects, to compare if printing defects are identified, for the printed microarrays, the identified printing defects for the printed microarrays and to use the outcome of this comparison to classify the identified printing errors as random or non-random printing defects, and use said classification to select a corrective action to improve the quality of the microarrays, prior to the printing of a subsequent print pass.

Suitably the device further comprises:
at least a second camera capable of obtaining an image of the substrate on which a microarray is to be printed, wherein the at least first camera is positioned behind the print head, and the at least second camera is positioned ahead of the print head, seen in the direction of movement of the print head.

BRIEF DESCRIPTION OF THE DRAWINGS

Embodiments of the invention will now be described by way of example only with reference to the drawings, in which.

DETAILED DESCRIPTION

Figure 1:
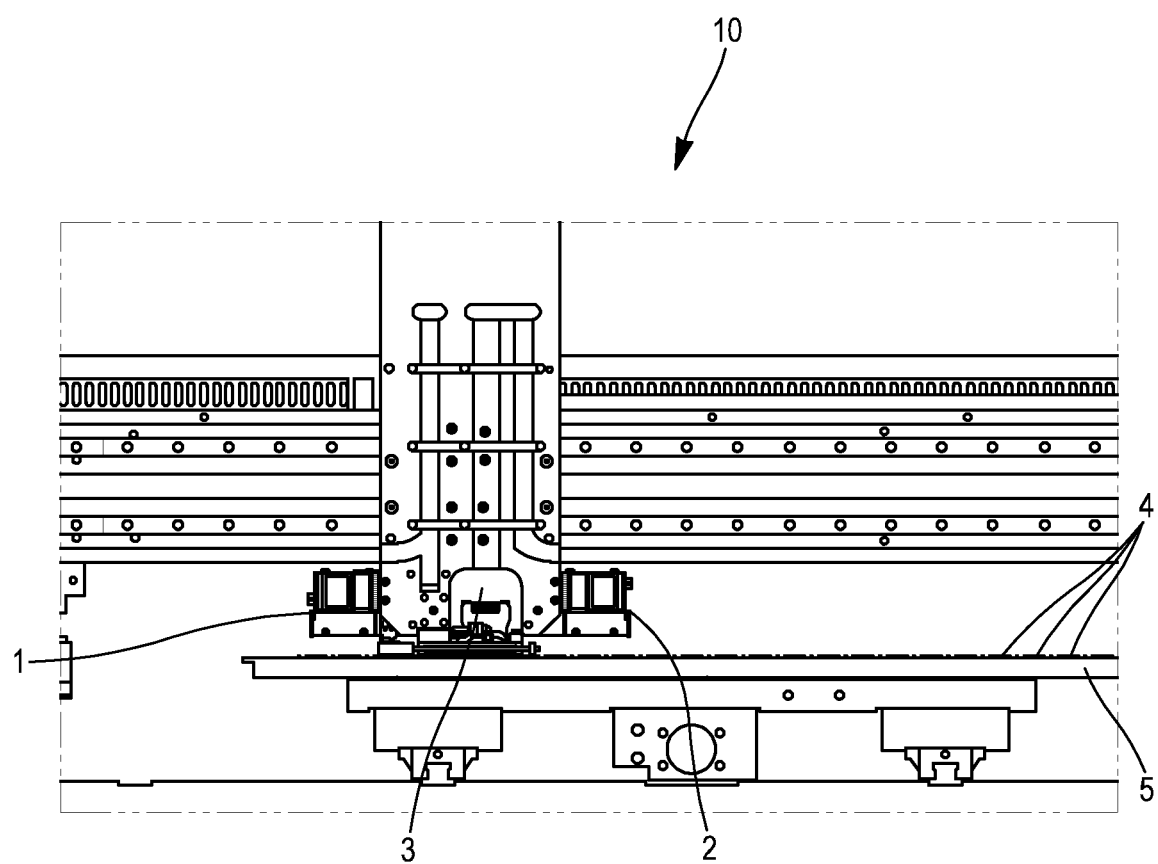
FIG. 1 illustrates a cross sectional view of apparatus of the present invention.

In the following description, numerous specific details are set forth in order to provide a thorough understanding of various illustrative embodiments of the invention. It will be understood, however, to one skilled in the art, that embodiments of the invention may be practiced without some or all of these specific details. In other instances, well known process operations have not been described in detail in order not to unnecessarily obscure pertinent aspects of embodiments being described. In the drawings, like reference numerals refer to same or similar functionalities or features throughout the several views.

In the present description, reference is made to a reagent. The word reagent is intended to refer to any biological material which is adapted to be used for obtaining microarrays by means of printing.

In the present description, the word microarrays is used to refer to the a combination of a substrate provided with a plurality of spots dispensed on top of the substrate wherein the spots are dispensed on the substrate in an orderly manner, each of the spots containing a determined quantity of biological material. In the present description, reference is made to a printhead. The printhead is intended to refer to an apparatus adapted to dispense biological material on a substrate, for instance by using a plurality of nozzles.

Referring to FIG. 1, a cross sectional view of a microarrayer 10 is shown. The microarrayer 10 comprises a printhead 3 which is adapted to dispense reagent on a substrate. The printhead 3 is typically adapted to load a plurality of reagents, wherein each of the recipients for containing said reagents is connected to a plurality of nozzles for dispensing the reagents on the substrate.

The printhead 3 is mounted in the microarrayer to allow relative movement of the printhead with respect to a substrate which, according to FIG. 1 has the form of a tray 5 on which a plurality of slides 4 is positioned. As seen in FIG. 1, the printhead is typically adapted to move from right to left over the tray 5 in a first print pass and then to move backwards from left to right in a subsequent printpass wherein the first and each subsequent printpass must essentially be parallel.

The microarrayer 10 is provided with a first camera 1 and a second camera 2 which are positioned at opposite side of the printhead 3. The camera 1 is adapted to move behind the printhead 3 when the printhead 3 is moving in a printpass from left to right as seen in FIG. 1. That means that camera 1 can obtain an image of the substrate (microslide) 4 during the movement of the assembly of the printhead 3 and the camera 1 from left to right as seen in FIG. 1. Once a printpass is completed, the movement of the assembly of the printhead 3 and the first camera 1 and the second camera 2 will be inversed. In a subsequent printpass, the camera 2 will be positioned behind the printhead 3 and therefore in a subsequent printpass the camera 2 can be used to obtain images of the substrate (microslide) 4 after printing a reagent on the substrate by means of the printhead 3.

In order for the microarray 10, according to FIG. 1, to function properly, the cameras 1 and 2 are mounted inline with the printhead 3, wherein camera 1 and camera 2 each have a determined distance with respect to the printhead 3. Moreover, the cameras 1 and 2 will be perpendicular with respect to the substrate in order to allow proper imaging of the substrate by means of the cameras 1 and 2.

In a specific embodiment of the invention, it is possible to use both the first camera 1 and a second camera 2 to obtain images of the substrate 4 during a single printpass. For instance, when the printhead is moving from right to left, as seen in FIG. 1, the first camera 1 can be used to obtain an image of the substrate 4 prior to dispensing reagent on a substrate 4 by means of the printhead 3. Subsequently, camera 2 can be used to obtain an image of the substrate after the dispensing of reagents on the substrate by means of the printheads 3. That means that the images of both camera1 and camera 2 can be used to analyse the microarray obtained after the dispensing of reagent by means of the printhead 3. For instance, if camera 1 has obtained an image of the substrate prior to printing wherein the defect misalignment or contamination of the slides can be observed. This information can be used to improve the analysis of the image of the same substrate once the microarray has been produced.

In the microarray 10, according to FIG. 1, the first and second camera 1, 2 will be connected to processing means (not shown in FIG. 1). These processing means are specifically adapted to perform image processing to retrieve from the images obtained by using cameras 1 and 2 information on the quality of the microarray produced on the substrate. The processing means will be provided with known algorithms to allow image processing. The processing means will be connected to control means (not shown in FIG. 1) which are specifically adapted to generate instructions of the operation printhead 3. This means that once the processing means have processed images obtained by cameras 1 and 2, data can be forwarded to the control means to generate instructions for the printhead, for instance, to alter the operation of the printhead in a subsequent printpass to improve the quality of microarrays to be obtained.

According to an embodiment of the invention, the control means will be able to recognise whether possible defects observed in microarrays obtained during a printpass are either random errors or non-random errors. In case the errors observed in the microarrays are non-random errors, specific amendment of the printhead is possible to improve the quality of microarrays to be obtained. The functioning of the production of instructions for the printhead is described in the following example. In case the processing means after analysis of a series of images have determined that the spots obtained by using a specific nozzle in the printhead contains printing errors, the control means can generate an instruction to the printhead to no longer use the respective nozzle. In a subsequent printpass, instead of using the defective nozzle, an alternative nozzle can be used to avoid repetition of the printing error.

According to the invention, the review of the quality of the microarrays can be performed during a print job, at the end of each print pass of said print job. At the end of a print pass, for each of the microarrays printed, in a first step, possible printing defects are identified. These printing defects relate to printing errors which have occurred during the printing of the reagent on the substrate.

To allow the identification of the printing defects, the images of the printed microarrays which are obtained during a printing pass are used to calculate parameters which are indicative for the quality of the microarray. These parameters can indicate, for example: the presence or absence of individual spots of a micro array; the size of the individual spots in a microarray; the circularity of the spots of the microarray; the actual position of the spots in a microarray; the presence of possible satellites, which means small quantities of reagent present in the vicinity of spots, etc.

Once the parameters for the printed microarrays have been calculated, the parameters can be compared with predetermined criteria for the microarrays. These criteria comprise minimum requirements for, for example, the size, the position and the circularity of the spots of the microarrays for the microarrays to pass a quality inspection. For instance for the size, the position and the circularity of the spots intervals can be determined between which the actual values of the printed microarrays should fall to classify a printed microarray as a pass.

Once available, the calculated parameters can be compared with the determined criteria to identify, per microarray, specific printing defects between the determined criteria and the actual parameters. Once this comparison is completed, for a print pass, it can be analysed whether there are printing defects between the determined criteria and the calculated parameters and if so, what these printing defects relate to.

This means that per print pass the quality of the different microarrays can be established and compared to the quality of the other microarrays in the same print pass. This means that at the end of a print pass it can be reviewed whether a printing defect occurs only one time or several times. If the printing defect occurs only once, it is likely that the printing defect is a random printing defect, which occurred for one of the microarrays in a print pass, but which is not repeated in any of the other microarrays.

If a printing defect occurs several times, or in all microarrays, the printing defect is likely linked to either the functioning of the print head or linked to the characteristics of the reagent loaded in the print head and used for the printing of the microarrays.

For instance, if in all microarrays a certain spot is missing, apparently there is a problem with the nozzle printing the specific spot. According to another example, if there is a printing problem with all nozzles which are used to print a specific reagent, the problem is likely related to the reagent used. This means that, for instance, that there is a problem with the viscosity of the reagent.

According to the invention the identification of printing defects and the classification thereof as random or not random, is automated.

According to an example, the classification occurs as follows:

In a first step images are obtained of the printed microarrays, wherein the images allow the analysis of the individual spots of the printed microarrays on a substrate.

In a second step the images are analysed to identify, for the printed microarrays, and the individual spots thereof, possible printing errors.

The following printing defects could occur:

1) A spot is missing. This means that the dispensing printing head was supposed to print a spot, but the spot has not been printed or is misplaced such that the spot has not been captured in the obtained image of the micro array.

2) A spot is misplaced. This means that a spot is present on the substrate, but the spot is misplaced from the intended spot position by more than a predetermined displacement threshold. This positional accuracy is expressed in micrometres. The centre of an actual printed spot is compared to the centre of the area in which the spot should have been located. If the distance between the actual centre of the spot and the expected centre of the spot is larger than the user defined threshold, the spot is classified as misplaced.

For instance, the default value is 44 um (having a range of 33->111 um).

3) The spot has bad morphology. Each spot is intended to have a circular form. The spot morphology will have a predetermined threshold for the circularity. According to an example a spot is classified as having bad morphology if the spot circularity is below 80%.

The circularity of a spot is calculated by comparing the radius mean square error ($Rad_{mse}$, which compares each radius that form the spot to the average radius) to the radius average. The radius mean square error is represented in the following formula:

$$Rad_{mse} = \sum_{r=1}^{n} (r_i - Rad_{avg})^2$$

$$\text{Circularity} = \left(1 - \frac{Rad_{avg}}{Rad_{avg} + Rad_{mse}}\right) \times 100$$

4) A spot is a big spot or a small spot. A spot is classified as being a big spot if the spot size is above an average size by more than a predetermined percentage. A spot is considered small if the spot is below a predetermined spot size.

For the spot sizes a spot size consistency parameter is used. The spot size consistency represents the spot size that is expected, namely a 70% spot size consistency allows a variation of 30% in the spot size. This means, for instance, if the average spot size (radius) is 10 pixels, every spot with more than 13 pixels will be classified as big; every spot having less than 7 pixels will be classified as small.

5) The presence of satellites. Satellites are small misplaced spots detected in areas where a larger spot is present closer to the expected area centre for a spot. According to an example, satellites are reported present when there are 3 or more small misplaced spots present for a set of spots. The presence of 1 or 2 satellites per set of spots is ignored.

6) Spots have merged. If spots are present, but have bad morphology, and their size is larger than the average, it is possible that at least a spot is missing in the neighbour areas.

7) Spot with artefact. This means that a spot has bad morphology, is bigger in size than the average, but that there are no missing spots in the neighbour areas. The extra size comes from an artefact.

8) Artefact. Artefacts which are not touching any spot are ignored.

9) Extra Spot. This means that there is more than one good spot detected where there should only be one spot. The extra spot can, for instance, be a badly misplaced spot. For instance, the extra spot can be a spot from a previous printed row which has printed badly.

Once the printing defects have been identified, according to a first alternative, the printing defects can are grouped by slide when generating a report on the quality of the slide. The user defines the threshold of what will be classified as a PASS or a FAIL by setting a maximum number of spots missing (%) and maximum number of other defects (%).

Every slide which defects are below the threshold will be classified as PASS. If the slide comprises defects, up to 5% above that threshold, the slide will be defined as CAUTION (the user can still ignore those slides, or take a look at the images and decide if they are usable). Any slide with more defects is classified as a FAIL.

According to a second alternative, once the printing defects have been identified for images of microarrays printed in the same print pass, part of said print pass or several printpasses, the printing defects can be reviewed prior to printing a subsequent print pass. If printing defects have been identified and classified as non-random printing defects, in a following step a possible cause for the printing defect can be selected.

To allow this, a list of possible causes can be provided in a database. An expert system can be used to link a specific type of printing defect with a possible cause for the printing defect. The list of possible causes for the printing defect can be completed with a list of possible solutions for corrective action to be taken once the possible cause for the printing defects has been selected.

According to an example the database could comprise the following combinations of printing defects, possible causes and possible solutions:

EXAMPLE I a) printing defect: a spot is missing for only one of a group of nozzles which are all printing the same reagent;
b) possible cause: the nozzle which has not printed the spots is not functioning properly;
c) possible solution: continue printing, but do not use the defective nozzle anymore.

EXAMPLE II a) printing defect: a spot is missing for all nozzles which are printing the same reagent;
b) possible cause: there is a problem with the reagent or the reagent is missing;
c) possible solution: stop printing and prior to continuing of the printing load new reagent.

According to the second alternative, if printing defects have been identified in the same print pass, part of said print pass or several print passes, and classified as random printing defects, in a following step a possible corrective action for the printing defect can be selected.

To allow this, a list of possible causes can be provided in a database. An expert system can be used to link a specific type of printing defect with a possible cause for the printing defect. The list of possible causes for the printing defect can be completed with a list of possible solutions for corrective action to be taken once the possible cause for the printing defects has been selected.

According to an example the database could comprise the following combinations of printing defects, possible causes and possible solutions:

EXAMPLE I a) printing defect: a spot is missing for only one of printed microarrays; the same spot is present in the other microarrays;

b) possible cause: the nozzle which has not printed the one spot is functioning properly, but one random printing defect occurred;

c) possible solution: continue printing, but prior to printing the subsequent print pass, return to the microarray with the missing spot, to correct said spot.

EXAMPLE II a) printing defect: a spot is missing for only one of printed microarrays; the same spot is present in the other microarrays;

b) possible cause: the nozzle which has not printed the one spot is functioning properly, but one random printing defect occurred;

c) possible solution: continue printing, and return to the microarray with the missing spot, to correct said spot at the end of the print job.

The above described analysis and classification of spots and microarrays is executed by analysing the spot images using well defined functions to identify the defect type. The processing means used for analysing the quality of the spots and classifying the spots may comprise a feature where a form of artificial intelligence (e.g. neural network, fuzzy logic, etc.) is used to achieve, by learning through example, more accurate defect identification and classification.

The assembly of the printhead 3 and the cameras 1 and 2 will be provided with illumination means to allow illumination of the substrate prior to or during obtaining of images by means of the cameras 1 and 2. Typically, the illumination means will be adapted to eliminate the substrate having the direction of the impact of the light on the substrate being perpendicular to the surface of the substrate. Depending on the reagent printed on the substrate and on the material used for the substrate, there will be a difference in the capacity of the reagent and the substrate to reflect light impacted on the substrate. This difference in reflection allows obtaining of images representative of the microarray produced on the substrate.

As seen in FIG. 1 in the device according to the invention the imaging system is comprised of two cameras. The camera moving behind the print head 3 is used to capture the spots after they have been printed; the camera ahead of the print head 3 in the direction of movement can be used to image the surface before the spots are printed.

This arrangement provides additional information which can be used to identify artefacts or dirt. This information can then be used to produce a more accurate analysis and report of the printing defects (for instance, knowing that there will be artefacts beforehand), to identify and report dirty slides, and to allow the use of an expert system to provide instructions to the print head 3 taking into account the fact that the printing occurs on dirty slides.

Figure 2:
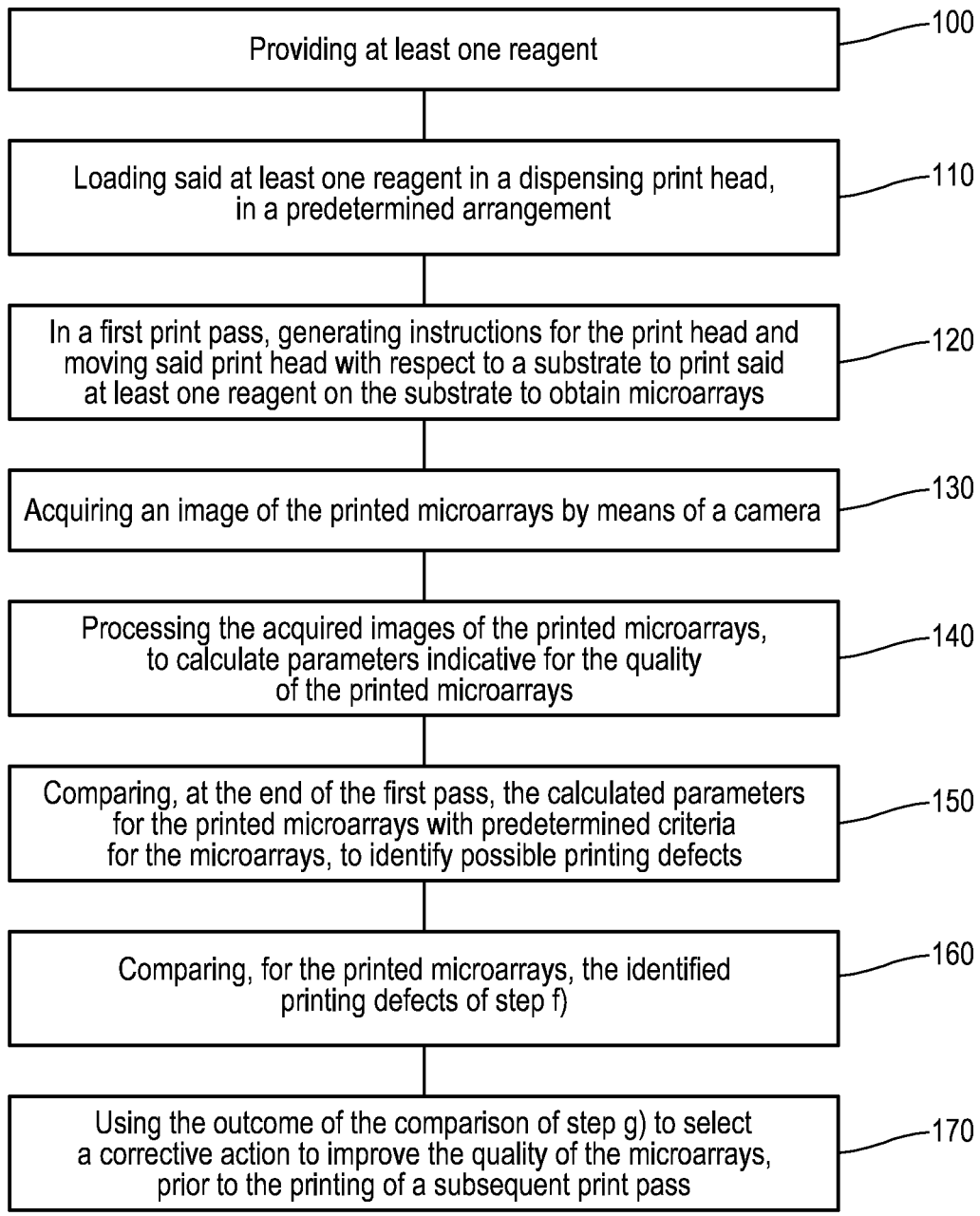
FIG. 2 illustrates a flowchart of the method of the present invention.

FIG. 2 illustrates a flowchart of the method of the present invention.

According to FIG. 2 in a first step 100 at least one reagent is provided, In a further step 110 at least one reagent is loaded in a dispensing print head, in a predetermined arrangement.

In a further step 120, in a first print pass, instructions are generated for the print head and said print head is moved with respect to a substrate to print said at least one reagent on the substrate to obtain microarrays.

In a further step 130 an image is obtained of the printed microarrays by means of a camera.

In a further step 140 the obtained images of the printed microarrays are processed, to calculate parameters indicative for the quality of the printed microarrays.

In a further step 150, at the end of the first print pass, the calculated parameters for the printed microarrays are compared with predetermined criteria for the microarrays, to identify possible printing defects.

In a further step 160, for the printed microarrays, the identified printing defects of step 150 are compared.

In a further step 170, the outcome of the comparison of step 160 is used to select a corrective action to improve the quality of the microarrays, prior to the printing of a subsequent print pass.

With reference to the observations above is it noted that the method and the device according to the invention allow analysis of printed microarrays during the printing process. Moreover, the method and the device allow for corrective action to be taken during a printing job, to improve the quality of the printed microarrays during the production thereof, without the need to complete a print job prior to analysing the quality of a completed print job.

The method and the device according to the invention allow further improving the production process of microarrays and allowing for cost saving due to instantaneous corrective action being possible.

During printing corrective action can be taken to improve the quality of microarrays to be printed, to correct microarrays that have already been printed or to stop printing to prevent further wastage of reagent.

The invention claimed is:

1. A method for manufacturing microarrays and verifying the quality of said microarrays, wherein the method comprises:

a) providing at least one reagent, b) loading said at least one reagent in a dispensing print head, in a predetermined arrangement, c) in a first print pass of a print job, generating instructions for the print head and moving said print head with respect to a substrate to print said at least one reagent on the substrate to obtain microarrays, d) obtaining an image of the printed microarrays by means of a camera during the first print pass, e) processing the obtained images of the printed microarrays, to calculate parameters indicative for the quality of the printed microarrays, f) comparing, at the end of the first print pass of the print job, the calculated parameters for the printed microarrays with predetermined criteria for the microarrays, to identify possible printing defects, g) if printing defects are identified, comparing, for the printed microarrays, the identified printing defects of step f), h) using the outcome of the comparison of step g) to classify the identified printing defects as random or non-random printing defects, and i) using the classification of step h) to select a corrective action to improve the quality of the microarrays, prior to the printing of a subsequent print pass.

2. The method according to claim 1, wherein the method comprises:

j) in case the printing defects in step h) are classified as non-random printing defects:

k) selecting a possible cause for the non-random printing defects, l) amending the generation of instructions for the print head and/or amending arrangement of the print head prior to the printing of a subsequent print pass.

3. The method according to claim 2, wherein the step of selecting a possible cause for the non-random printing defects comprises;

selecting the cause of the printing defect to be linked to a reagent problem.

4. The method according to claim 3, wherein the step of amending the generation of instructions for the print head and/or amending arrangement of the print head prior to the printing of a subsequent print pass comprises:

loading new reagent.

5. The method according to claim 2, wherein the step of selecting a possible cause for the non-random printing defects comprises:

selecting the cause of the printing defect to be linked to the non-functioning of a nozzle.

6. The method according to claim 5, wherein the step of amending the generation of instructions for the print head and/or amending arrangement of the print head prior to the printing of a subsequent print pass comprises:

instructing the use of a nozzle, different from the non-functioning nozzle.

7. The method according to claim 1, wherein the method comprises:

m) in case the printing defects in step h) are classified as random printing defects:

n) reviewing of the non-random printing defects, and o) using the result of the review of step o) to decide to select between continuing printing or reprinting of microarrays or individual spots elements thereof.

8. The method according to claim 1, wherein the step of obtaining an image of the printed microarrays by means of a camera, comprises: p) obtaining per microarray a first image of the substrate prior to printing of the microarray with a first camera, positioned ahead of the print head and obtaining a second image of the substrate after the printing of the microarray on the substrate.

9. The method according to claim 8, wherein the step of processing the obtained images of the printed microarrays comprises:

q) processing per microarray the image of the substrate obtained by means of the first camera and the image of the substrate obtained by means of the second camera to calculate parameters indicative for the quality of the printed microarray.

10. A device for manufacturing microarrays and verifying the quality of said microarrays, the device comprising:

a dispensing print head, adapted to contain at least one reagent, means for generating instructions to said print head and for moving said print head during a first print pass of a print job with respect to a substrate to print said at least one reagent on the substrate to obtain microarrays, at least a first camera capable of obtaining an image of the substrate during the first print pass, wherein a microarray is printed on the substrate, processing means, connected to the at least first camera, adapted to receive the image from the at least first camera, and adapted to calculate parameters indicative for the quality of the printed microarrays, wherein the processing means are further adapted to compare, at the end of the first print pass, the calculated parameters for the printed microarrays with predetermined criteria for the microarrays, to identify possible printing defects, to compare if printing defects are identified, for the printed microarrays, the identified printing defects for the printed microarrays and to use the outcome of this comparison to classify the identified printing errors as random or non-random printing defects, and use said classification to select a corrective action to improve the quality of the microarrays, prior to the printing of a subsequent print pass.

11. The device according to claim 10, wherein the device further comprises:

at least a second camera capable of obtaining an image of the substrate on which a microarray is to be printed, wherein the at least first camera is positioned behind the print head, and the at least second camera is position ahead of the print head, seen in the direction of movement of the print head.

\* \* \* \* \*

UNITED STATES PATENT AND TRADEMARK OFFICE
CERTIFICATE OF CORRECTION

PATENT NO. : 11,052,370 B2
APPLICATION NO. : 16/640028
DATED : July 6, 2021
INVENTOR(S) : Benjamin Mitchell and Joan Salvatella Serra Page 1 of 1

It is certified that error appears in the above-identified patent and that said Letters Patent is hereby corrected as shown below:

In the Claims

Claim 7, at Column 11, Line 31, delete "non-"; and

Claim 7, at Column 11, Line 32, delete "step o)" and insert --step n)--.

Signed and Sealed this
Eighteenth Day of January, 2022

Drew Hirshfeld
*Performing the Functions and Duties of the*
*Under Secretary of Commerce for Intellectual Property and*
*Director of the United States Patent and Trademark Office*